United States Patent
Wallick et al.

(10) Patent No.: US 9,770,851 B2
(45) Date of Patent: Sep. 26, 2017

(54) MATERIALS HANDLING SYSTEM, STRIATED PATTERNED PRODUCT, AND PROCESS OF FORMING A STRIATED PATTERNED PRODUCT

(75) Inventors: Bennett E. Wallick, Strasburg, PA (US); Randy A. Friedel, Willow Street, PA (US)

(73) Assignee: AFI Licensing LLC, Lancaster, PA (US)

( * ) Notice: Subject to any disclaimer, the term of this patent is extended or adjusted under 35 U.S.C. 154(b) by 609 days.

(21) Appl. No.: 13/308,691

(22) Filed: Dec. 1, 2011

(65) Prior Publication Data
US 2013/0142989 A1    Jun. 6, 2013

(51) Int. Cl.
| B29C 43/24 | (2006.01) |
| B29C 31/00 | (2006.01) |
| B29C 31/08 | (2006.01) |
| B29C 43/34 | (2006.01) |

(52) U.S. Cl.
CPC .............. *B29C 43/24* (2013.01); *B29C 31/00* (2013.01); *B29C 31/085* (2013.01); *B29C 2043/3427* (2013.01); *B29C 2043/3494* (2013.01); *Y10T 428/24132* (2015.01)

(58) Field of Classification Search
CPC .. B29B 7/52; B29B 7/56; B29B 7/606; B29B 7/562; B29C 43/24; B29C 33/044; B29C 44/485; B29C 43/20; B29C 39/20; B29C 43/245; B29C 43/30; Y10S 425/235
USPC ........................ 264/76, 173.1, 175
See application file for complete search history.

(56) References Cited

U.S. PATENT DOCUMENTS

| 2,314,062 A | * | 3/1943 | Alvey et al. ..................... 264/76 |
| 2,319,040 A | * | 5/1943 | Conklin ......................... 264/144 |
| 2,478,885 A | * | 8/1949 | Alvey ............................ 264/144 |
| 2,508,414 A | * | 5/1950 | Meyer ........................... 264/144 |
| 2,534,291 A | * | 12/1950 | Moss ............................. 264/175 |
| 2,694,831 A | * | 11/1954 | Benedict et al. ............... 264/39 |
| 2,917,781 A | * | 12/1959 | Petry ............................. 264/76 |
| 2,938,236 A | * | 5/1960 | Robb ............................. 264/175 |
| 3,129,194 A | | 4/1964 | Kupits |
| 3,182,587 A | | 5/1965 | Woodhall |
| 3,194,856 A | * | 7/1965 | Palmer .......................... 264/112 |

(Continued)

FOREIGN PATENT DOCUMENTS

FR    2 852 551 A1    9/2004

OTHER PUBLICATIONS

ASTM Standard Specification for Vinyl Compostion Floor Tile: F1066-04, 2010.*

*Primary Examiner* — Timothy Kennedy

(57) ABSTRACT

Disclosed is a materials handling system, a patterned product, and process of fabricating a patterned product, such as non-pvc thermoplastic, through-color, flooring product includes a narrow, long-grained, striated color pattern. The process includes mixing colored particles into a mixed composition, receiving the mixed composition between calendering rolls wherein a front calendering roll which is hotter than a back calendering roll, and forming a product with an elongated pattern. The materials handling system includes a mixing portion disposed to mix colored particles into a mixed composition. The system also include a processing portion disposed to receive the mixed composition, the processing portion having a front calendering roll which is hotter than a back calendering roll.

17 Claims, 4 Drawing Sheets

(56) References Cited

U.S. PATENT DOCUMENTS

| | | | |
|---|---|---|---|
| 3,264,682 A * | 8/1966 | Freeman | 425/151 |
| 3,320,639 A * | 5/1967 | Harp | 366/76.3 |
| 3,429,959 A * | 2/1969 | Salhofer | 264/175 |
| 3,658,978 A * | 4/1972 | Ancker | 264/175 |
| 3,765,817 A * | 10/1973 | Ancker | 425/325 |
| 5,510,398 A * | 4/1996 | Clark et al. | 523/171 |
| 6,503,424 B2 * | 1/2003 | Graab et al. | 264/37.29 |
| 2003/0077431 A1 * | 4/2003 | Balmer et al. | 428/207 |
| 2008/0081882 A1 | 4/2008 | Tian et al. | |
| 2013/0095289 A1 * | 4/2013 | Friedel et al. | 428/141 |

* cited by examiner

MATERIALS HANDLING SYSTEM, STRIATED PATTERNED PRODUCT, AND PROCESS OF FORMING A STRIATED PATTERNED PRODUCT

FIELD OF THE INVENTION

The present invention relates to materials handling systems, products fabricated from materials handling systems, and processes for fabricating products. More specifically, the present invention relates to the process of producing striated pattern products, the materials handling systems for forming the striated pattern products, and the striated pattern products.

BACKGROUND OF THE INVENTION

Vinyl and non-vinyl products can include a heterogeneous layer of colored particles or chips. Such flooring products are used in various facilities and applications where performance improvement comes from having the particles or chips extend throughout the thickness of the product. Such through-color flooring products can be formed to have relatively short-grained striated patterns. The processes and systems used to manufacture these types of products have been designed to maximize the output of the short-grained striated patterns.

Longer striated patterns are provided on luxury vinyl tile. These longer striated visuals are achieved via rotogravure printing of a vinyl film which is laminated to the luxury vinyl tile. However, this process cannot be used with vinyl composition tile, as the vinyl film does not provide the performance or the through grain and through color required for vinyl composition tile.

Through-color products are also used in ceilings, walls, table-tops, counter-tops, cabinets, or other suitable applications. Other layered flooring products are used where simulations of wood grains, marble, or other natural long-grained striated design patterns are achieved by printing the design patterns onto a thin film layer.

As discussed, known layered vinyl flooring products fabricated with a long-grained striated pattern suffer from a drawback of not having desired properties such as through-color and/or through-pattern. This results in an undesirable visual quality of the patterns due to wear over time. The through-color flooring products suffer from a drawback of having relatively short-grained striated patterns that do not provide users with the desired long-grained simulations of naturally occurring flooring materials.

A materials handling system, a striated patterned product, and a process of fabricating such a striated patterned product that do not suffer from one or more of the above drawbacks would be desirable in the art.

BRIEF DESCRIPTION OF THE INVENTION

According to an embodiment, a process for forming a product includes, mixing colored particles into a mixed composition, receiving the mixed composition between calendering rolls wherein a front calendering roll which is hotter than a back calendering roll, and forming a product with an elongated pattern.

According to an embodiment, a process for forming a product includes, mixing colored particles into a mixed composition, receiving the mixed composition between calendering rolls wherein the back calendering roll turns at a faster speed than the front calendering roll, and forming a product with an elongated pattern.

According to another embodiment, a materials handling system includes a mixing portion disposed to mix colored particles into a mixed composition. The system also include a processing portion disposed to receive the mixed composition, the processing portion having a front calendering roll which is hotter than a back calendering roll.

According to another embodiment, a non-pvc thermoplastic, through-color, flooring product includes a narrow, long-grained, striated color pattern.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a materials handling system, a striated patterned product, and a process of fabricating a striated patterned product, and in particular, a non-pvc thermoplastic, through-color, striated flooring product. Embodiments of the present disclosure permit fabrication of striated patterned products not previously available, provide elongated visual striated patterns with products having through-grain and through-color, and permit increased visual quality.

Figure 1:
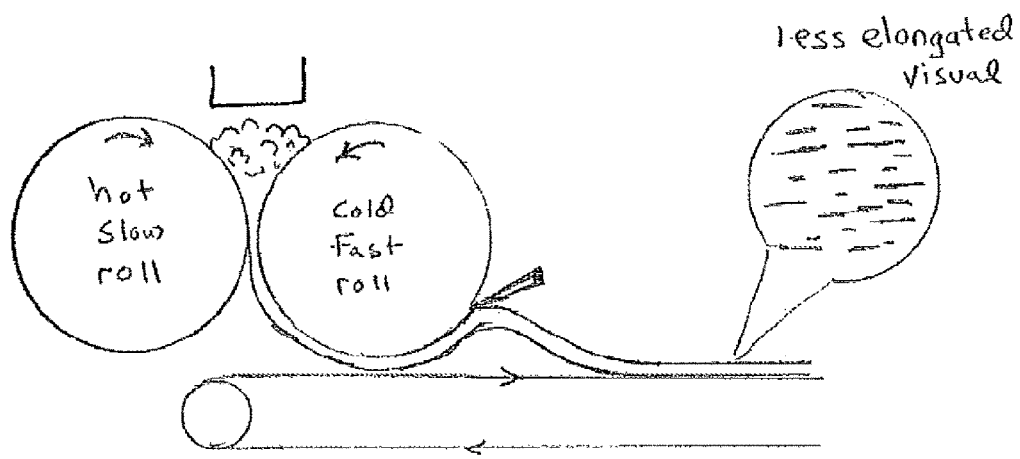
FIG. 1 is a diagrammatic view of a known process and equipment for manufacturing vinyl composition tile having a short-grained striated pattern.
Figure 2:
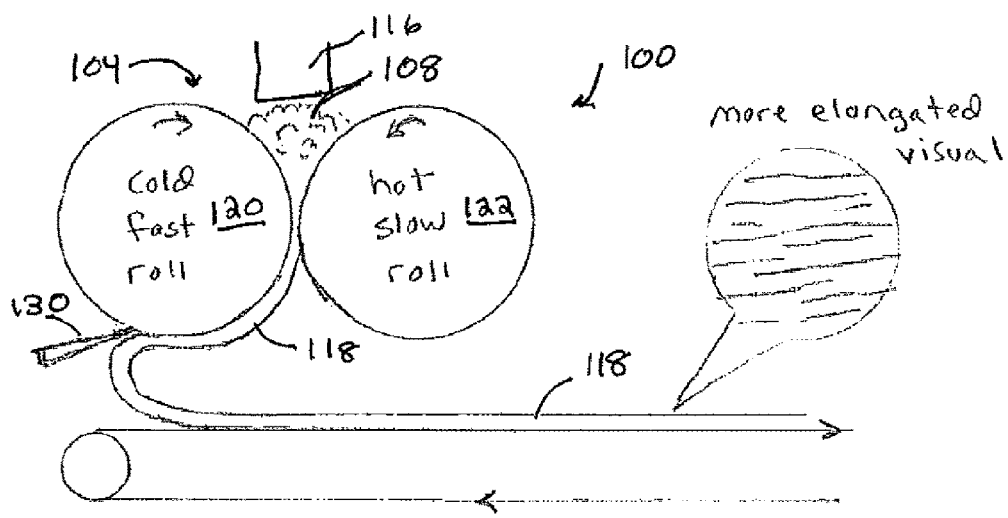
FIG. 2 is a diagrammatic view of an exemplary process and equipment for manufacturing vinyl composition tile having an elongated visual striated pattern according to the present invention.
Figure 3:
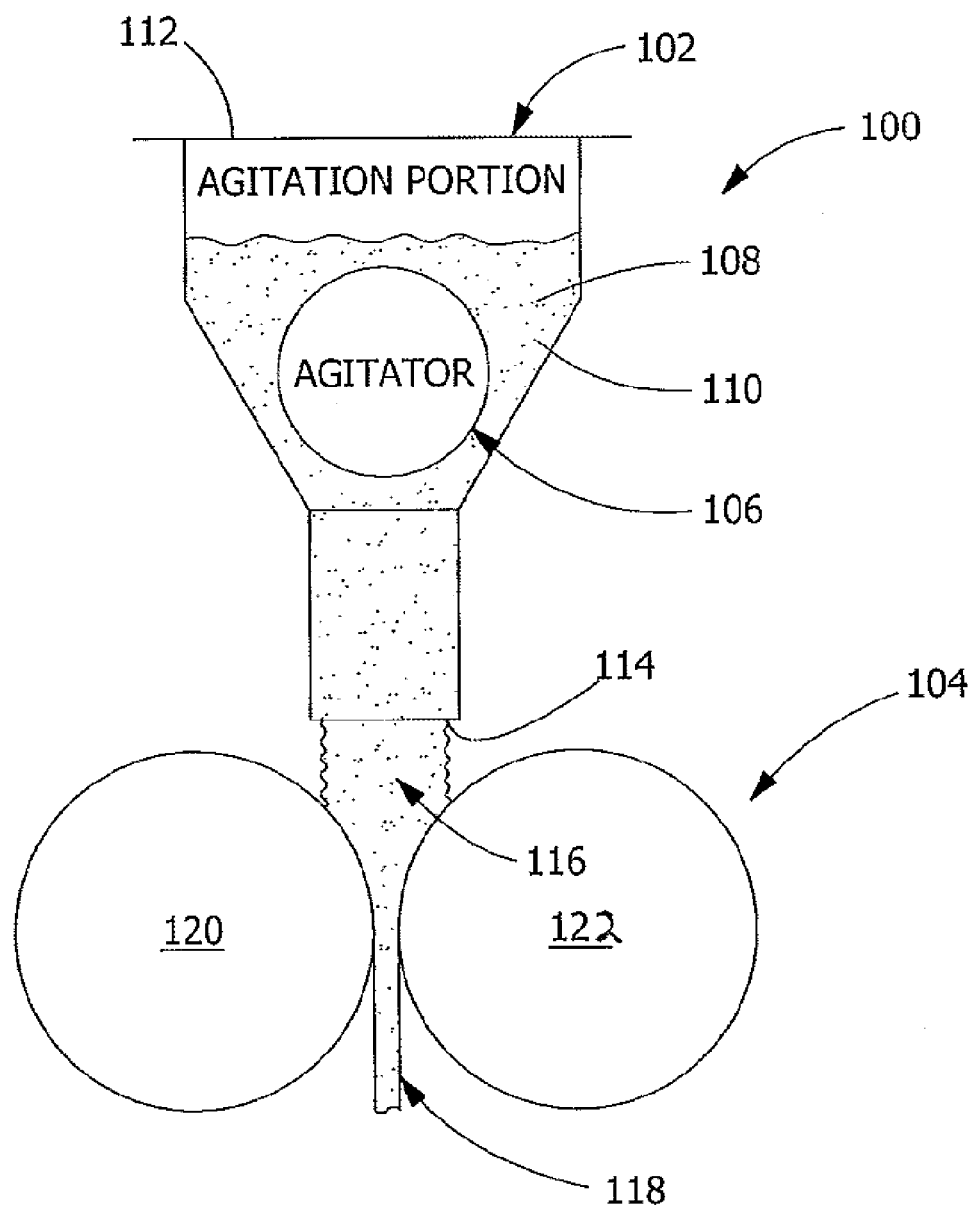
FIG. 3 is a schematic diagram of an exemplary materials handling system having an agitation portion and a processing portion which can be used in the exemplary process of manufacturing an elongated visual striated pattern.

Referring to FIGS. 2 and 3, in one embodiment, a materials handling system 100 is configured to process a non-pvc thermoplastic composition of the type of material described in U.S. Patent Publication Number 2008/0081882, which is hereby incorporated by reference in its entirety. The materials handling system 100 includes an mixer or mixing portions 102 and a processing portion 104 arranged and disposed downstream from the mixer 102. The mixer 102 may be a hopper or other suitable container configured for handling a mixed composition 108. Traditionally, vinyl composition tile (VCT) manufacturing processes have utilized low intensity "dough" type heated mixers to compound/melt mix the tile formulation which is subsequently calendered into a layer. Higher intensity mixers such as extruders or Farrell type mixers may also be employed, and these high intensity mixers may also be heated to higher temperatures to compound the tile formulation.

As an example, tile formulations comprising amorphous, polyester resins were mixed using a low intensity Baker Perkins heated mixer. The ingredients were added to the mixer which was heated to 325 degrees Fahrenheit. The formulations were mixed and heated for approximately 7-11 minutes on average in a Baker Perkins mixer to a drop temperature of approximately 280 degrees Fahrenheit. Depending upon the formulation, mixing time varied between 7-28 minutes and drop temperature varied between approximately 270 degrees Fahrenheit and 290 degrees Fahrenheit, as more fully described in Example 3 of U.S. Patent Publication Number 2008/0081882.

Referring to FIG. 3, the mixer 102 may include one or more agitator 106. The agitator 106 is arranged and disposed within the mixer 102 to mix the composition 108. In one embodiment, the mixed composition 108 includes colored particles or chips 110 of multiple colors and sizes and one or more of other materials, such as a binder. In one embodiment, the colored particles 110, such as colored chips, are fed into an intake 112 of the mixer 102 upstream of the agitator 106, where the colored particles 110 tend to adhere to each other or settle in clumps or clusters when entering the mixer 102. The agitator 106 mixes, delumps and breaks up the clusters of colored particles 110 into a substantially uniform distribution within composition 108 for release at a discharge region 114 downstream from the agitator 106. In one embodiment, the mixed composition 108 consists of only colored particles 110. In one embodiment, the mixed composition 108 includes colored particles 110 and other materials (for example, clear particles, liquids, or other fluids). In one embodiment, the mixed composition 108 includes multiple types of materials of different compositions, such as bio-based, fossil fuel based, or geological based materials. In one embodiment, the geological based material includes clay or limestone. The length of time the colored particles are mixed contributes to the variation in color in the final product 118, i.e. the longer the colored particles are mixed, the more variation in color that can be achieved.

In one embodiment, the colored particles 110 are a maximum of about ½ inch in width, height and/or length. In one embodiment, the colored particles 110 are a minimum of about 1/32 inch in width, height and/or length. In one embodiment, the colored particles 110 are between about 1/32 inch and about ½ inch in width, height and/or length, are between about 1/16 inch and about ¼ inch in width, height and/or length, and between about ⅛ inch and about ¼ inch in width, height and/or length, or any suitable combination or sub-combination thereof. In one embodiment, the colored particles may be approximately cubed shaped or any other shape which yields the desired visual to the product 118. In one embodiment, the colored particles 110 will comprise about 5% of the total mixed composition, 20% of the total mixed composition, 25% of the total mixed composition, 80% of the total mixed composition, between about 5% and about 80% of the total mixed composition, between about 15% and about 40% of the total mixed composition, between about 20% and about 25% of the total mixed composition, or any suitable combination or sub-combination thereof.

In one embodiment, the processing portion 104 includes a receiving portion 116, such as a nip. In one embodiment, the receiving portion 116 is arranged and disposed to receive the mixed formulation of substantially uniform distribution of the colored particles 110 to form a product 118 with a predetermined pattern (see also FIGS. 4A-B). In one embodiment, the processing portion 104 includes any suitable mechanism, such as two or more calendering rolls 120, 122 to form the product 118.

The calendering rolls 120, 122 include further processing features, such as rotating at different speeds and operating at different heating temperatures, to provide the predetermined pattern of the product 118. The back calendering roll 120 turns faster than the front calendering roll 122. For example, the speed of the back roll or upstream roll 120 is between about 1.1 to about 3.0 times faster than the speed of the front roll or downstream roll 122, between about 1.2 to about 2.0 times faster than the speed of the front roll 122, between about 1.2 to about 1.9 times faster than the speed of the front roll 122, between about 1.5 to about 1.8 times faster than the speed of the front roll 122, or any suitable combination or sub-combination thereof. Small changes to the relative speed of the rolls 120, 122 will not greatly impact the visual of the product 118.

In order to provide the desired visual to the product 118, the back calendering roll 120 has a lower temperature than the front calendering roll 122. For example, the temperature of the back roll 120 is between about 150 degrees Fahrenheit to about 270 degrees Fahrenheit, between about 220 degrees Fahrenheit to about 270 degrees Fahrenheit, between about 240 degrees Fahrenheit to about 260 degrees Fahrenheit, or any suitable combination or sub-combination thereof. For example, the temperature of the front roll 122 is between about 250 degrees Fahrenheit to about 330 degrees Fahrenheit, between about 280 degrees Fahrenheit to about 330 degrees Fahrenheit, between about 290 degrees Fahrenheit to about 310 degrees Fahrenheit, or any suitable combination or sub-combination thereof.

Figure 4A:
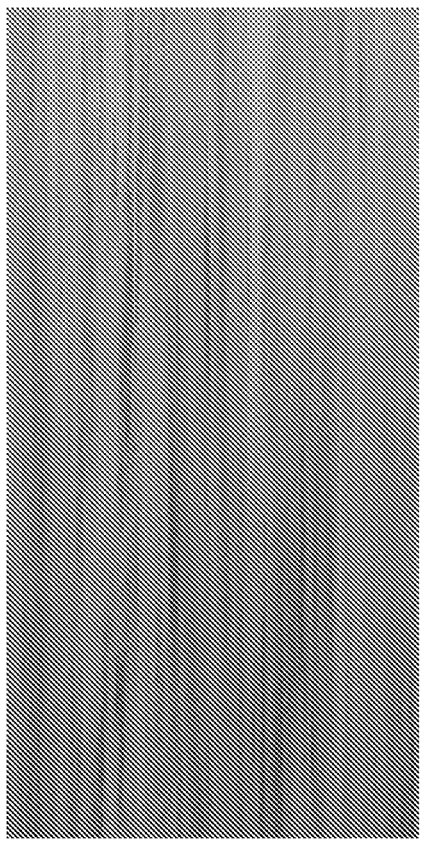
FIGS. 4A-B illustrate top views of example long-grained striated patterned products according to embodiments of the present invention.
Figure 4B:
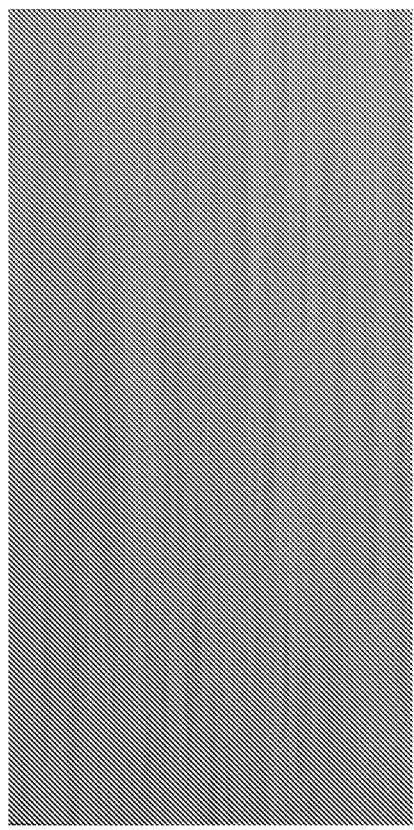
Figure 5:
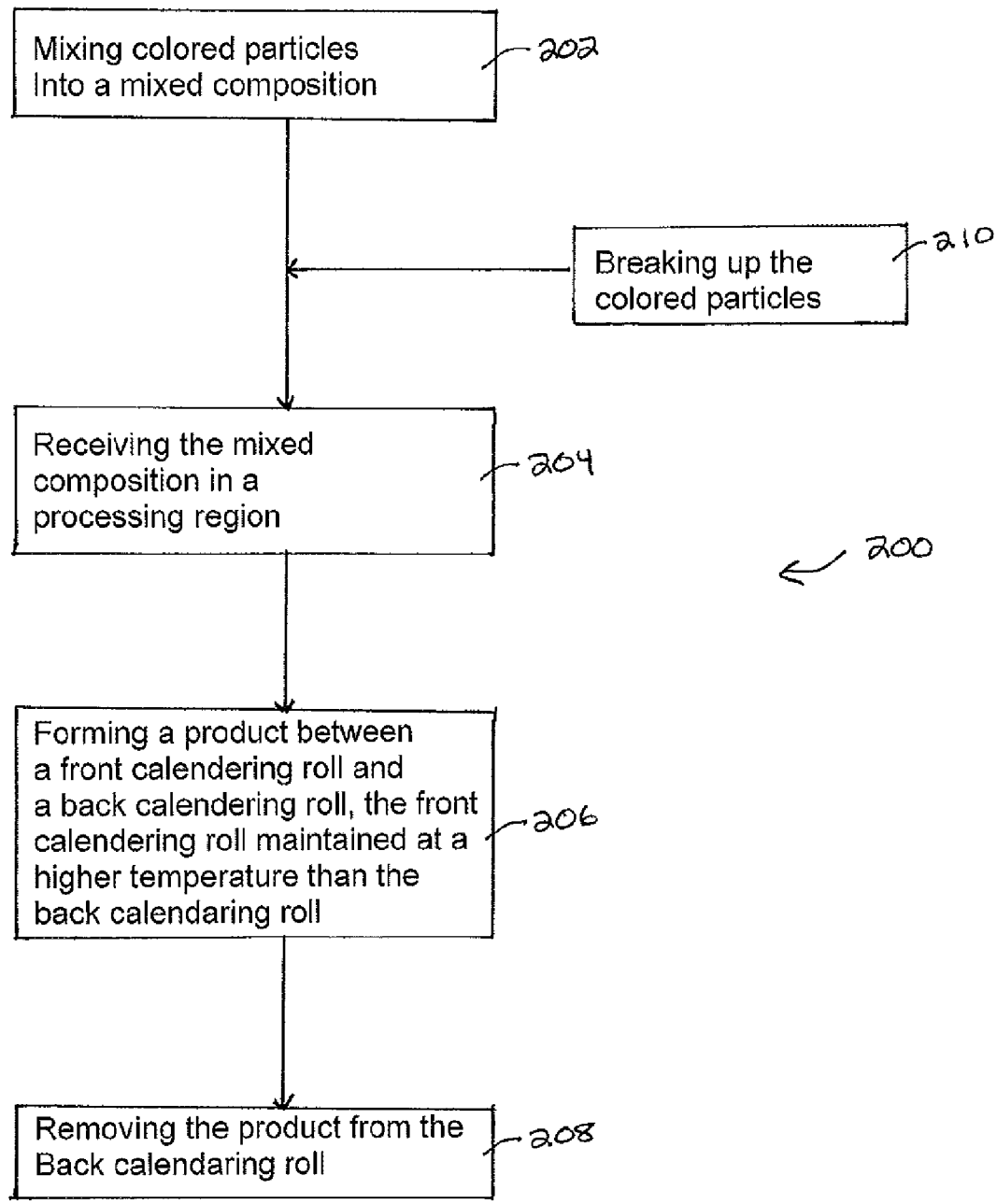
FIG. 5 is a flow chart of an exemplary process of forming a striated patterned product according to an embodiment of the disclosure.

Referring to FIG. 5, in one embodiment, a process 200 of fabricating a product (for example, the product 118 of FIGS. 1 through 4A-B). The process 200 includes mixing colored particles into a mixed composition with a substantially uniform distribution (step 202), for example, by rotating the agitator 106. This allows the colored particles to be properly distributed on the product 118, thereby providing a more gradual transition between colors for a more pleasant visual on the product 118. Next, the process 200 includes receiving the mixed composition of the colored particles 110 (step 204), for example, in the nip or receiving portion 116, and forming a product 118 with an elongated pattern (step 206), for example, by use of calendering rolls 120, 122. In one embodiment, the predetermined pattern formed is a long-grained, striated color pattern. During this forming process step, due to the relative heat and speed of the rolls 120, 122, the composition will stick to the back roll 120 and smear against the front roll 122. The smearing will cause the elongation and additional blending of the colored particles 110 to produce the desired visual of the product 118. The formed product is removed from the back roll 120 by means of an doctor blade 130 or other known device (step 208).

The relative speed and temperatures of the rolls 120, 122 provide the visual as described herein. In addition, the relative speed and temperatures of the rolls 120, 122 also helps to minimize gas bubbles from being trapped in the composition as the product is formed. Therefore, blisters formed by gas bubbles or air entrapment is minimized, resulting in less waste and a better visual for the product.

In a further embodiment, the process 200 includes further breaking up the colored particles 110 (step 210), for example, by passing through a grid 150 downstream from the agitator 106, as more fully described in co-pending U.S. patent application Ser. No. 13/274,868, which is hereby incorporated by reference in its entirety. As will be appreciated, the process 200 includes any other suitable steps for forming the features described above. The process 200 permits fabrication of products having a striated pattern and the feature of through-color and/or through-pattern, thereby maintaining the visual quality of the patterned product as the surface of the product wears away over time.

In one embodiment, the product 118 includes a vinyl composition. Suitable vinyl compositions include, but are not limited to, polyvinylchloride (including copolymers and/or homopolymers), luxury vinyl tile, vinyl compositions of vinyl composition tile, and vinyl compositions of vinyl asbestos tile (or products replacing asbestos). In a further embodiment, the vinyl composition includes one or more plasticizers, one or more stabilizers, one or more binders, one or more fillers, and/or one or more pigments, such as a chloride processing pigment (for example, titanium dioxide). In one embodiment, the plasticizer includes or is a non-phthalate plasticizer. In one embodiment, the binder includes or is any suitable polymeric material. In one embodiment, the product 118 includes bio-based materials (for example, materials having a carbon-14 signature identifying the materials as being from a non-synthetic source), recycled materials (for example, materials capable of being identified as being from a previously used product), renewable materials (for example, materials capable of being decomposed), or combinations thereof.

In one embodiment, the product 118 includes filler at a concentration of, by weight, between about 20% and about 90%, between about 30% and about 80%, between about 40% and about 70%, between about 50% and about 60%, between about 20% and about 30%, between about 30% and about 40%, between about 40% and about 50%, between about 50% and about 60%, between about 60% and about 70%, between about 70% and about 80%, between about 80% and about 90%, at about 20%, at about 30%, at about 40%, at about 50%, or any suitable combination or sub-combination thereof. In one embodiment, the binder includes or is any suitable polymeric material.

Referring to FIGS. 4A-B, in one embodiment, the predetermined pattern of the product 118 is a narrow, long-grained, striated color pattern. In one embodiment, the predetermined pattern is variegated or marbleized. In one embodiment, the predetermined pattern includes a majority of long, thin, linear, substantially parallel, mottled color marks, strands, bands or patches. In one embodiment, the streaks or color marks are randomly located in the pattern such that the average distance between similarly sized mottled color marks of the predetermined pattern varies. The features "elongated", "narrow", "thin", "long", and "long-grained" are relative to ratio characteristics of the color marks. In one embodiment, the color mark ratio characteristic includes a first dimension, for example, length, and a second dimension, for example, width, whereby the width may range from about $\frac{1}{32}$ inch to about $\frac{1}{2}$ inch and the length may range from about 2 inches to about 24 inches, or any suitable combination or sub-combination thereof. In one embodiment, the ratio of the first dimension to the second dimension is about 500 or more to 1, about 65 to 1, about 12 to 1, about 6 to 1, about 4 to 1, between about 500 to 1 and about 4 to 1, or any suitable combination or sub-combination thereof. As a result of the mixing and calendering processes used, the wider streaks or color marks can be more blended and more subdued relative to the background color of the product 118, while the narrower streaks can be more concentrated and more pronounced than the wider streaks.

In one embodiment, the predetermined pattern is termed "Striations". In one embodiment, the Striations pattern is produced in a VCT flooring product. In one embodiment, the Striations pattern includes a first color group, for example, a lighter colored background, and a second color group, for example, darker colored mottled elongate marks.

The substantially uniform distribution of the colored particles 110 provides the predetermined pattern throughout the thickness of product 118 so that the desired visual pattern remains as the top layer of product is worn away from use over time. In one embodiment, the predetermined pattern is configured to simulate naturally occurring striated patterns, found in organic materials such as glacier rock, marble or wood. The substantially uniform distribution of the colored particles 110 provides for the predetermined pattern colors and textures to be distributed substantially uniformly throughout the thickness of product 118, such that the product 118 is configured to be through-color, through-grained, and meets or exceeds the specification standards for through-pattern Class 2 according to ASTM F 1066 guidelines. In 1995, the American Society for Testing and Measurement (ASTM) provided a definition for 1066 Class 2 through-pattern tile as "either the pattern and colors on the surface of the tile extend entirely through the thickness of the tile without significant change, or the colors appearing on the surface shall extend throughout the entire thickness of the tile, although the appearance of the pattern created by these colors will change throughout the thickness".

The predetermined pattern of product 118 is produced by calendering rolls 120, 122. In one embodiment, a portion or all of the vinyl composition of the product 118 (for example, the resin(s), the plasticizer(s), and the filler(s)) is blended and mixed, then milled and melt-processed to form the product 118. The melt-processing is by calendering, extruding, continuous mixing, molding, milling, other melt-processes, or a combination thereof. In one embodiment, the processing portion 104 includes suitable mechanisms to provide pre-heating before calendering, additional calendering, subsequent heating, curing, or any suitable combination or sub-combination thereof. In one embodiment, the product 118 includes a backing layer and/or one or more surface layers. In one embodiment, after initial processing, the product 118 is further cooled, and then press die-cut into planks, tiles, or any other suitable product.

As used herein, the phrase "color strands or patches" refers to strands or patches composed of groupings of color micro-fibers of various widths. For example, in one embodiment, micro-fibers are any suitable micro-fibers suspended within a material or arranged by any suitable technique. As used herein, the term "micro-fiber" refers to any fiber having a dimension that is on the order of micrometers ($10^{-6}$ meters). Individually, the micro-fibers are visually indiscernible. For example, in embodiments of the present disclosure, the micro-fibers have a diameter of less than about 1500 micrometers, a diameter of less than about 100 micrometers, a diameter of less than about 50 micrometers, a diameter of less than about 10 micrometers, a diameter range of about 10 micrometers to about 1500 micrometers, a diameter range of about 10 micrometers to about 1000 micrometers, a diameter range of about 20 micrometers to about 500 micrometers, a diameter range of about 50 micrometers to about 500 micrometers, a diameter range of about 100 micrometers to about 500 micrometers, a diameter range of about 20 micrometers to about 400 micrometers, or a diameter range of about 40 micrometers to about 200 micrometers, the diameter being measured over a central 20%, 50%, 80%, or all of the micro-fiber, for example, as measured through image analysis tools coupled with electron microscopy. Additionally or alternatively, in embodiments of the present disclosure, the micro-fibers have dimensional variance of less than 20%, dimensional variance of less than 5%, or dimensional variance of less than 1% over the region of greatest variance.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for forming a product, the process comprising:
   a) mixing colored particles into a mixed composition;
   b) rotating an agitator to obtain a substantially uniform distribution of the colored particles in the mixed composition;
   c) feeding the mixed composition between calendering rolls, the calendering rolls including a front calendering roll which is hotter than a back calendering roll and the back calendering roll rotating at a faster speed than the front calendering roll, the front calendering roll having a first axis of rotation and the back calendering roll having a second axis of rotation;
   d) forming a product along a machine direction, the product having an elongated pattern, wherein the first axis of rotation is located downstream of the second axis of rotation in the machine direction
   wherein the mixed composition sticks to the back calendering roll during step c), thereby causing the mixed composition to be smeared by the front calendering roll to create the elongated pattern that exists on the product formed in step d).

2. The process of claim 1, wherein the elongated pattern is a long-grained or striated color pattern.

3. The process of claim 1, wherein the elongated pattern includes a majority of long, thin, linear, substantially parallel, mottled color marks, strands, bands or patches.

4. The process of claim 1, wherein the elongated pattern is through-patterned as to include colors and textures distributed uniformly throughout the thickness of the product.

5. The process of claim 1, wherein the back calendering roll turns between about 1.1 to about 3.0 times faster than the front calendering roll.

6. The process of claim 1, wherein the back calendering roll turns between about 1.2 to about 1.9 times faster than the front calendering roll.

7. The process of claim 1, wherein the back calendering roll turns between about 1.5 to about 1.8 times faster than the front calendering roll.

8. The process of claim 1, wherein the back calendering roll is between about 150 degrees Fahrenheit to about 270 degrees Fahrenheit.

9. The process of claim 1, wherein the back calendering roll is between about 220 degrees Fahrenheit to about 270 degrees Fahrenheit.

10. The process of claim 1, wherein the front calendering roll is between about 250 degrees Fahrenheit to about 330 degrees Fahrenheit.

11. The process of claim 1, wherein the front calendering roll is between about 280 degrees Fahrenheit to about 330 degrees Fahrenheit.

12. The process of claim 1, wherein the color particles are less than ½ inch in width, height and length.

13. The process of claim 1, wherein micro-fibers having a diameter of from about 10 to about 1500 micrometers are added to the mixed composition prior to step c).

14. The process of claim 2, wherein micro-fibers having a diameter of from about 10 to about 1500 micrometers are added to the mixed composition prior to step c).

15. A process for forming a product, the process comprising:
   mixing colored particles and micro-fibers into a mixed composition;
   feeding the mixed composition between calendering rolls including a front calendering roll and a back calendering roll, the front calendering roll having a first axis of rotation and the back calendering roll having a second axis of rotation, the back calendering roll rotating at a faster speed than the front calendering roll; and
   forming a product along a machine direction, the product having an elongated pattern, wherein the first axis of rotation is located downstream of the second axis of rotation in the machine direction.

16. The process of claim 15, wherein the micro-fibers have a diameter of from about 10 to about 1500 micrometers.

17. A process for forming a product, the process comprising:
   a) mixing colored particles into a mixed composition;
   b) feeding the mixed composition between calendering rolls, the calendering rolls including a first calendering roll and a second calendering roll, the front calendering roll having a first axis of rotation and the back calendering roll having a second axis of rotation;
   c) forming a product along a machine direction, the product having an elongated pattern;
   wherein the first axis of rotation is located downstream of the second axis of rotation in the machine direction, wherein the front calendering roll is hotter than the back calendering roll, and wherein the mixed composition sticks to the back calendering roll during step b), thereby causing the mixed composition to be smeared by the front calendering roll to create the elongated pattern that exists on the product formed in step c).

* * * * *